(12) United States Patent
Oguni

(10) Patent No.: US 9,799,450 B2
(45) Date of Patent: Oct. 24, 2017

(54) CERAMIC GREEN SHEET, METHOD FOR MANUFACTURING MULTILAYER CERAMIC CAPACITOR, AND MULTILAYER CERAMIC CAPACITOR

(71) Applicant: Murata Manufacturing Co., Ltd., Nagaokakyo-shi, Kyoto-fu (JP)

(72) Inventor: Toshimi Oguni, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/072,580

(22) Filed: Mar. 17, 2016

(65) Prior Publication Data

US 2016/0196919 A1    Jul. 7, 2016

Related U.S. Application Data

(63) Continuation of application No. PCT/JP2014/059854, filed on Apr. 3, 2014.

(30) Foreign Application Priority Data

Sep. 20, 2013  (JP) ................. 2013-195499

(51) Int. Cl.
    *C04B 35/468*    (2006.01)
    *H01G 4/12*      (2006.01)
    (Continued)

(52) U.S. Cl.
    CPC .......... *H01G 4/1227* (2013.01); *B32B 18/00* (2013.01); *C04B 35/4682* (2013.01); *C04B 35/6261* (2013.01); *C04B 35/62807* (2013.01); *C04B 35/62815* (2013.01); *C04B 35/638* (2013.01); *C04B 37/001* (2013.01); *H01G 4/1281* (2013.01); *H01G 4/232* (2013.01); *H01G 4/30* (2013.01); *C04B 2235/3206* (2013.01);

(Continued)

(58) Field of Classification Search
    CPC .......................... C04B 35/4682; H01G 4/1227
    See application file for complete search history.

(56) References Cited

U.S. PATENT DOCUMENTS 6,762,141 B2    7/2004  Gohike et al.
8,609,748 B2 *  12/2013  Tanabe .................... C01B 33/12
                                                        428/403

(Continued)

FOREIGN PATENT DOCUMENTS

CN    101182201 A     6/2008
JP    2001307939 A    11/2001
(Continued)

OTHER PUBLICATIONS

International Search Report for PCT/JP2014/059854, date of mailing Jul. 8, 2014.

(Continued)

*Primary Examiner* — Karl Group
(74) *Attorney, Agent, or Firm* — Arent Fox LLP

(57) ABSTRACT

A ceramic green sheet where the proportion of a Si-containing constituent coating the surface of barium titanate-based ceramic particles is 95% or higher, and the proportion of a rare-earth element-containing constituent coating the surface of the barium titanate-based ceramic particle is 85% or higher.

6 Claims, 3 Drawing Sheets

(51) Int. Cl.
  *H01G 4/30*   (2006.01)
  *H01G 4/232*  (2006.01)
  *B32B 18/00*  (2006.01)
  *C04B 35/626* (2006.01)
  *C04B 35/628* (2006.01)
  *C04B 35/638* (2006.01)
  *C04B 37/00*  (2006.01)

(52) U.S. Cl.
  CPC .............. *C04B 2235/3215* (2013.01); *C04B 2235/3224* (2013.01); *C04B 2235/3225* (2013.01); *C04B 2235/3236* (2013.01); *C04B 2235/3262* (2013.01); *C04B 2235/3418* (2013.01); *C04B 2235/365* (2013.01); *C04B 2235/5409* (2013.01); *C04B 2235/5445* (2013.01); *C04B 2235/5454* (2013.01); *C04B 2235/6025* (2013.01); *C04B 2235/6582* (2013.01); *C04B 2235/6584* (2013.01); *C04B 2237/346* (2013.01); *C04B 2237/704* (2013.01)

(56) References Cited

U.S. PATENT DOCUMENTS

| | | | |
|---|---|---|---|
| 9,266,781 B2* | 2/2016 | Wang | H01G 4/1227 |
| 2003/0109375 A1 | 6/2003 | Gohlke et al. | |
| 2009/0135546 A1* | 5/2009 | Wang | B32B 18/00 361/321.2 |
| 2011/0190432 A1* | 8/2011 | Tanabe | C04B 35/62807 524/403 |
| 2014/0102619 A1* | 4/2014 | Wang | B32B 18/00 156/89.14 |
| 2014/0160626 A1 | 6/2014 | Shiota et al. | |
| 2014/0179826 A1* | 6/2014 | Tanabe | C04B 35/62807 523/216 |

FOREIGN PATENT DOCUMENTS

| | | | |
|---|---|---|---|
| JP | 2003137649 | * | 5/2003 |
| JP | 2003527291 | A | 9/2003 |
| JP | 2007173714 | A | 7/2007 |
| JP | 2009154841 | A | 8/2009 |
| WO | WO 2013039045 | A | 3/2013 |

OTHER PUBLICATIONS

Written Opinion for PCT/JP2014/059654, date of mailing Jul. 8, 2014.

* cited by examiner

CERAMIC GREEN SHEET, METHOD FOR MANUFACTURING MULTILAYER CERAMIC CAPACITOR, AND MULTILAYER CERAMIC CAPACITOR

CROSS REFERENCE TO RELATED APPLICATIONS

The present application is a continuation of International application No. PCT/JP2014/059854, filed Apr. 3, 2014, which claims priority to Japanese Patent Application No. 2013-195499, filed Sep. 20, 2013, the entire contents of each of which are incorporated herein by reference.

FIELD OF THE INVENTION

The present invention relates to a ceramic green sheet for use in manufacturing a multilayer ceramic electronic component, a method for manufacturing a multilayer ceramic capacitor that uses the sheet, and a multilayer ceramic capacitor.

BACKGROUND OF THE INVENTION

As one of typical ceramic electronic components, there is a multilayer ceramic capacitor that has a structure, for example, as shown in FIG. 3.

This multilayer ceramic capacitor has, as shown in FIG. 3, a structure with external electrodes 54 (54a, 54b) provided so as to be electrically connected to a plurality of internal electrodes 52 (52a, 52b) on both end surfaces 53a, 53b of a ceramic laminated body (multilayer ceramic element) 60 that has the internal electrodes 52 (52a, 52b) laminated with ceramic layers (ceramic dielectric layers) 51 interposed between the internal electrodes.

In recent years, multilayer ceramic capacitors have been expanded in intended use, while the usage environments have increasingly become severe. Further, requests for characteristic enhancements have also increased, such as a reduction in size and an increase in capacitance.

Further, the increase in capacitance for multilayer ceramic capacitors is achieved by making dielectric elements thinner. This is also accompanied by increased effective areas and increased electric field intensities applied to the elements.

Thus, in order to ensure reliability in a thin layer and at a high electric field intensity while keeping the relative permittivity of a dielectric high, a dielectric ceramic is used which has a so-called core-shell structure with a minute amount of an additive component as a solid solution on the outer periphery of ceramic particles, for example, such as a barium titanate-based ceramic.

However, multilayer ceramic capacitors that use a ceramic having a core-shell structure as dielectric layers have, when have a region where no additive component is present at grain boundaries, a problem when a high electric field is applied to the region. In such a case, the electric field is concentrated on specific points of the ceramic dielectric layers, thereby accelerating degradation of insulation resistance.

Therefore, in order to ensure the reliability, it is important to decrease the proportion of grain boundaries at which the additive component is not present as a solid solution.

Under these circumstances, as a multilayer ceramic capacitor which has an increased high-temperature load life even when dielectric layers are reduced in thickness, a multilayer ceramic capacitor has been proposed which includes a plurality of dielectric layers composed of barium titanate-based crystal grains, a plurality of internal electrode layers containing nickel as their main constituent, formed between the dielectric layers, and external electrodes electrically connected to the internal electrode layers, and has center mean line roughness Rac of 20 nm or more and 100 nm or less at the interfaces between the dielectric layers and the internal electrode layers (see Patent Document 1).

More specifically, this multilayer ceramic capacitor is intended to suppress insulation resistance degradation of the multilayer ceramic capacitor under high temperature and high electric field, in a way that the asperity at the interfaces between the dielectric layers and the internal electrode layers is defined to fall within a predetermined range.

Further, Patent Document 1 mentions, in an example thereof, the use of a $BaTiO_3$ powder of 0.15 μm in average particle size as a ceramic powder for dielectric green sheets for use in the manufacture of the multilayer ceramic capacitor, and the use of a glass powder containing $SiO_2$ of 0.1 μm in average particle size as its main constituent as a sintering aid. In this case, in the process of firing, a solid solution of additive elements in $BaTiO_3$ as a main raw material is believed to be achieved by turning into a liquid phase with, as a starting point, glass containing $SiO_2$ as its main constituent, and incorporating Y, Mn, Mg added to the liquid phase.

However, in the case of the composition as mentioned above, the $BaTiO_3$ powder as a main raw material is close in particle size to the glass powder containing $SiO_2$ as its main constituent, which serves as a starting point for the liquid phase. Thus, glass particles inhomogeneously containing $SiO_2$ as its main constituent will be present around the $BaTiO_3$ particles, and carrying out firing in the condition is believed to also cause the solid solution of the additive elements in $BaTiO_3$ to become inhomogeneous. Further, the dielectric ceramic in which the solid solution of the additive elements in $BaTiO_3$ is inhomogeneous becomes more likely to cause degradation of insulation resistance under high temperature and high electric field.

Therefore, in the multilayer ceramic capacitor with the above-mentioned dielectric ceramic as dielectric layers, which is prepared by the method according to the example in Patent Document 1 mentioned above, degradation of insulation resistance is believed to be caused under high temperature and high electric field.

Patent Document 1: Japanese Patent Application Laid-Open No. 2007-173714

SUMMARY OF THE INVENTION

The present invention is intended to solve the problem mentioned above, and an object of the invention is to provide a ceramic green sheet which is able to form a dielectric layer with a low proportion of grain boundaries with no additive component present to all grain boundaries in the dielectric layer. It is also an object of the present invention to, even when a high electric field is applied, suppress the electric field concentrated on a specific point of the dielectric layer, thereby suppressing progressive degradation of insulation resistance.

In order to solve the problem mentioned above, the ceramic green sheet according to the present invention is a ceramic green sheet containing a barium titanate-based ceramic particle as a main inorganic component, where a Si-containing constituent covers 95% or higher of a surface of the barium titanate-based ceramic particle, and a rare-earth element-containing constituent covers 85% or higher of the surface of the barium titanate-based ceramic particle.

It is to be noted that the Si-containing constituent coverage of 95% or higher mentioned above refers to a value of 95% or higher obtained from the following formula (1) in the ceramic green sheet according to the present invention.

Si-containing Constituent Coverage (%)=(Number of Points with Si Element/Number of Measurement Points)×100    (1)

However, although the number of points having the Si element present will be described in an embodiment herein, in the case of applying binder removal treatment to a ceramic green sheet for obtaining raw material particles, observing the surfaces of the raw material particles with a scanning transmission electron microscope (STEM), and confirming the presence amount of Si by point analysis with the use of EDX (energy dispersive X-ray spectrometry), points at which the detected concentration of Si to the total of detected elements excluding C and O is 0.5 atom % or higher are regarded as points with the Si element present, and the number of the points is regarded as the number of points with the Si element present.

In addition, the rare-earth element-containing constituent coverage of 85% or higher mentioned above refers to a value of 85% or higher obtained from the following formula (2).

Rare-Earth Element-containing Constituent Coverage (%)=(Number of Points with Rare-Earth Element/Number of Measurement Points)×100    (2)

However, although the number of points with the rare-earth element present will be described in the embodiment herein, in the case of applying binder removal treatment to a ceramic green sheet for obtaining raw material particles, observing the surfaces of the raw material particles with a scanning transmission electron microscope (STEM), and confirming the presence amount of the rare-earth element (such as dysprosium (Dy)) by point analysis with the use of EDX, points at which the detected concentration of the rare-earth element (such as Dy) to the total of detected elements excluding C and O is 0.5 atom % or higher are regarded as points with the rare-earth element present, and the number of the points is regarded as the number of points with the rare-earth element present.

In addition, the method for manufacturing a multilayer ceramic capacitor according to the present invention includes the steps of: stacking electrode-pattern applied sheets obtained by applying a conductive paste for formation of the internal electrodes to the ceramic green sheet described above so as to provide a predetermined pattern, thereby forming an unfired stacked structure to serve as the multilayer ceramic element after firing; firing the unfired stacked structure, thereby forming the multilayer ceramic element; and forming, on the multilayer ceramic element, an external electrode electrically connected to the internal electrodes.

In addition, the present invention provides a multilayer ceramic capacitor including: a multilayer ceramic element including a plurality of dielectric layers including a barium titanate-based ceramic, and a plurality of internal electrodes provided to be opposed to each other with the dielectric layers interposed therebetween; and an external electrode provided on a surface of the multilayer ceramic element and electrically connected to the internal electrodes, which is characterized in that a rare-earth element is present at 98% or higher of all grain boundaries in the barium titanate-based ceramic of the dielectric layers.

As described above, in the ceramic green sheet according to the present invention, the Si-containing constituent coverage is 95% or higher, and the rare-earth element-containing constituent coverage is 85% or higher. Thus, forming a dielectric layer of a multilayer ceramic capacitor with the use of the ceramic green sheet makes it possible to reduce the proportion of grain boundaries with no additive component present relative to all grain boundaries in the barium titanate-based ceramic of the dielectric layer. Further, as a result, even when a high electric field is applied, it becomes possible to suppress the electric field concentrated on a specific point of the dielectric layer, and degradation of insulation resistance can be suppressed.

In addition, the method for manufacturing a multilayer ceramic capacitor according to the present invention can be used to reliably manufacture a multilayer ceramic capacitor including a dielectric layer in which the proportion of grain boundaries with no additive component present to all grain boundaries is low for grain boundaries in the barium titanate-based ceramic. Further, even when a high electric field is applied, the electric field concentrated on a specific point is suppressed in the dielectric layer, and a highly reliable multilayer ceramic capacitor can be efficiently manufactured which is less likely to degrade the insulation resistance.

In addition, with the multilayer ceramic capacitor according to the present invention, even when a high electric field is applied, the electric field concentrated on a specific point of the dielectric layer can be suppressed.

DETAILED DESCRIPTION OF THE INVENTION

Features of the present invention will be described in more detail below with reference to an embodiment of the present invention.

Embodiment

Figure 1:
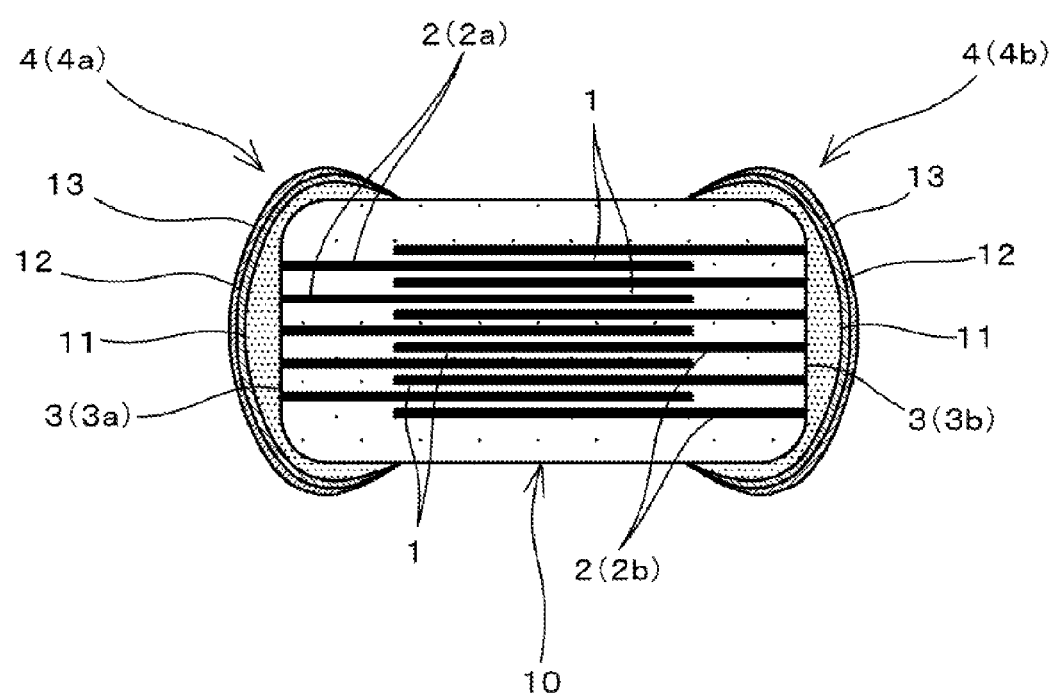
FIG. 1 is a front cross-sectional view illustrating the configuration of a multilayer ceramic capacitor according to an embodiment of the present invention.

The multilayer ceramic capacitor according to an embodiment of the present invention has, as shown in FIG. 1, a structure with external electrodes 4 (4a, 4b) provided so as to be electrically connected to a plurality of internal electrodes 2 (2a, 2b), on both end surfaces 3 (3a, 3b) of a multilayer ceramic element (ceramic body) 10 that has the internal electrodes 2 (2a, 2b) laminated with ceramic layers 1 as dielectric layers interposed therebetween.

The internal electrodes 2 (2a, 2b) are preferably non-precious metal electrodes containing Ni as their conductive component.

In addition, the external electrodes 4 (4a, 4b) preferably have a multilayer structure including an external electrode body 11 obtained by baking a conductive paste, a Ni plated film layer 12 formed on the surface of the external electrode body 11, and a Sn plated film layer 13 formed on the surface of the Ni plated film layer 12.

In addition, the dielectric layers (ceramic layer dielectric layers) 1 constituting the multilayer ceramic element (ceramic body) 10 of the multilayer ceramic capacitor are formed from a dielectric ceramic that has a perovskite structure (a barium titanate-based ceramic in this embodiment).

Next, a method for manufacturing this multilayer ceramic electronic component (multilayer ceramic capacitor) will be described.

<1> Preparation of Dielectric Raw Material (Ceramic Raw Material)

First, a barium titanate-based ceramic powder as a dielectric main constituent raw material was prepared in accordance with the following procedure.

$BaCO_3$ and $TiO_2$ powders were prepared, and weighed so that the molar ratio between Ba and Ti was 1:1.

Then, the powders were, with the addition of pure water and a dispersant thereto, subjected to grinding/crushing treatment with a forced-circulation wet grinding mill using PSZ media to create a main raw material slurry.

Next, the main raw material slurry subjected to the grinding/crushing treatment was dried in an oven, and subjected to heat treatment at a temperature of 950° C. or higher to obtain a barium titanate-based ceramic powder of 0.20 µm in average grain size.

In addition, besides the barium titanate-based ceramic powder of respective particle sizes obtained as described above, powders of $BaCO_3$, $Dy_2O_3$ (SSA (specific surface area): 30 m$^2$/g), $MgCO_3$, and $MnCO_3$ were prepared.

In addition, multiple types of $SiO_2$ powders varied in SSA (specific surface area) were prepared as additive $SiO_2$.

Then, the barium titanate-based ceramic powder and the respective additive components ($BaCO_3$, $Dy_2O_3$, $MgCO_3$, $MnCO_3$, $SiO_2$) were weighed and sampled in predetermined amounts, and with the addition of pure water and a dispersant thereto, subjected to grinding/crushing treatment with the use of a forced-circulation wet grinding mill (using PSZ media), thereby preparing a blended raw material slurry.

It is to be noted that for preparing the blended raw material slurry, as shown in Table 1, the combination of the types of $SiO_2$ varied in SSA (specific surface area) and the grinding/crushing treatment time were varied to prepare the blended raw material slurry.

In addition, in this regard, among the additive components, the additive amounts of $Dy_2O_3$, $MgCO_3$, $MnCO_3$, and $SiO_2$ were adjusted so that:

(a) the total content (parts by mol) of Dy was 4.0;
(b) the content (parts by mol) of Mg was 0.25;
(c) the content (parts by mol) of Mn was 0.25; and
(d) the content (parts by mol) of Si was 1.5;

when the total content of Ti was regarded as 100 parts by mol.

Furthermore, the $BaCO_3$ was added in a proportion such that the ratio of Ba to Ti (Ba/Ti (molar ratio)) after firing was 1.01 after firing.

Then, the slurry subjected to the grinding/crushing treatment was dried in an oven to obtain respective dielectric raw material powders.

<2> Preparation of Ceramic Green Sheet

The respective dielectric raw material powders prepared in the way described above was then, with the addition to a polyvinyl butyral-based binder and an organic solvent such as ethanol, subjected to wet mixing in a ball mill, thereby preparing ceramic slurry.

This ceramic slurry was subjected to sheet forming so that the fired dielectric element thickness was 5.0 µm, thereby providing rectangular ceramic green sheets.

It is to be noted that while the sheet forming was carried by a doctor blade method in this embodiment, the method for the sheet forming is not to be considered limited thereto, but it is possible to use other various known methods.

<3> Evaluation of Ceramic Green Sheet

First, the ceramic green sheets prepared in the way described above were heated for 2 hours under the condition of 400° C. in the air atmosphere to carry out binder removal treatment, thereby providing raw material particles as a barium titanate-based ceramic powder.

Then, the surface of the raw material particles were observed with a scanning transmission electron microscope (STEM) to confirm the amounts of Dy and Si present by point analysis with the use of EDX.

Further, in this regard, locations subjected to the point analysis on the raw material particles (barium titanate-based ceramic particles) will be described with reference to FIG. 2 which is a pattern diagram of a planar view of the raw material particle when the raw material particle has a spherical shape.

Figure 2:
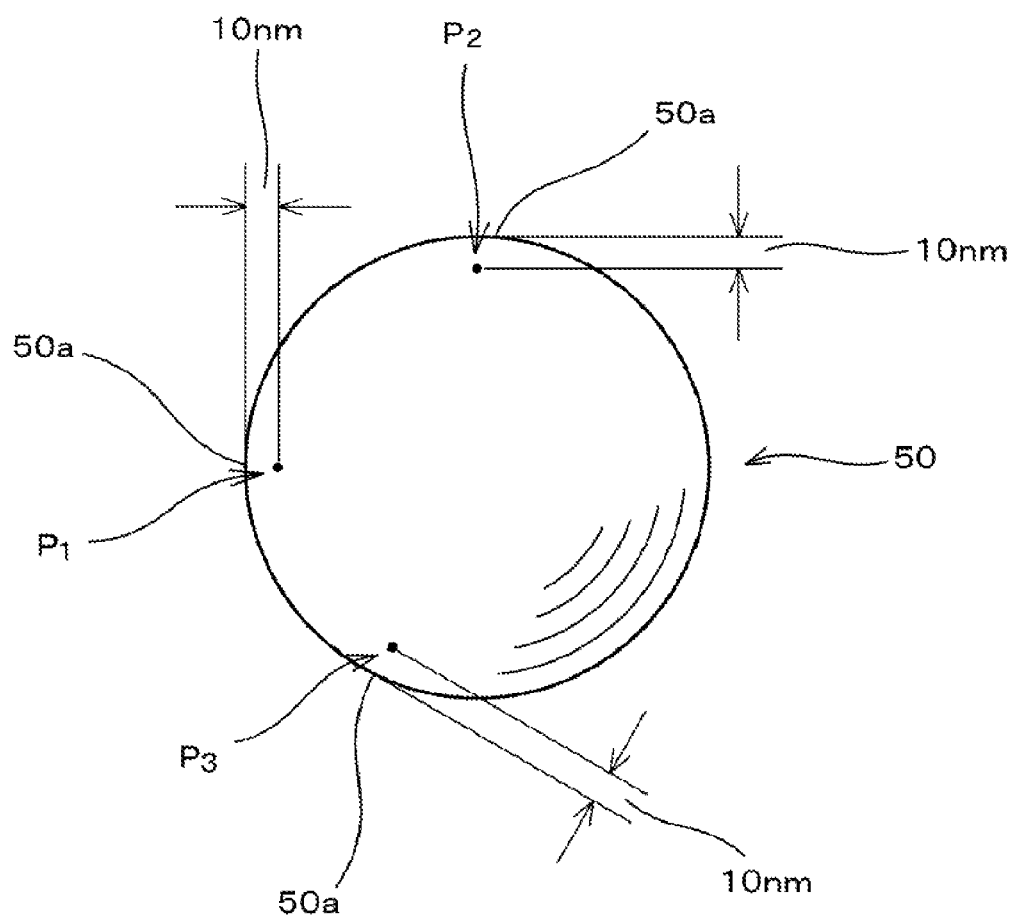
FIG. 2 is a diagram for explaining locations subjected to point analysis on a raw material particle (barium titanate-based ceramic) constituting a ceramic green sheet according to an embodiment of the present invention.
Figure 3:
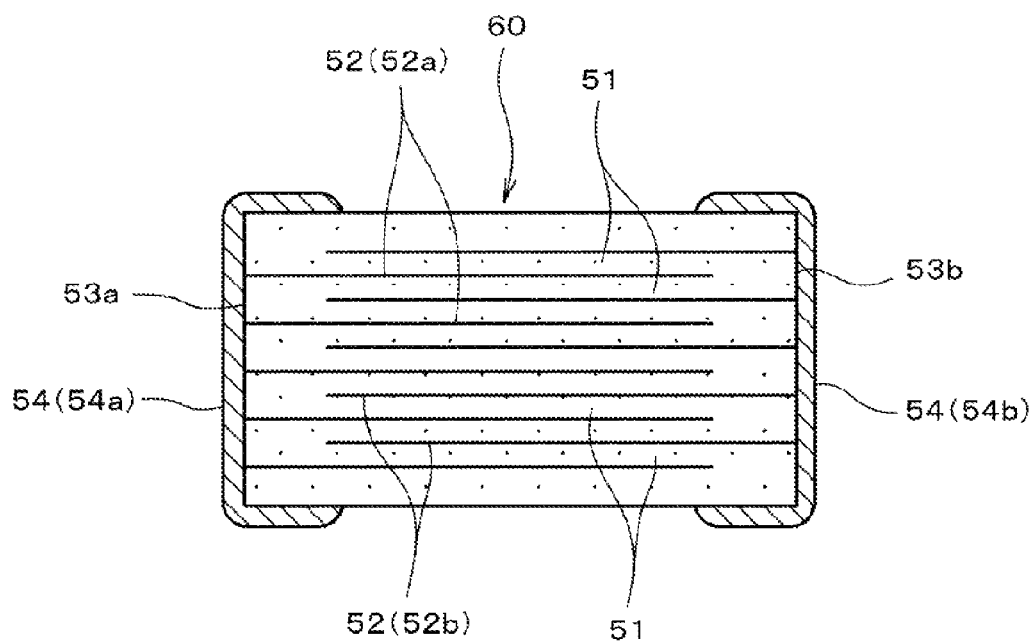
FIG. 3 is a diagram illustrating an example of a conventional multilayer ceramic capacitor.

More specifically, thirteen particles were subjected to the point analysis on eight points (the distance between the points was 50 nm or more) per particle, among points at 10 nm inside (toward a central direction) a spherical raw material particle 50 from an outer edge 50a of the barium titanate-based ceramic particle in FIG. 2 (points on the surface of the raw material particle (for example, $P_1$, $P_2$, $P_3$, etc. in FIG. 2)).

Therefore, the total number of point analyses in this case is 104 (8 points×13 particles=104).

Then, the Si-containing constituent coverage was obtained from the following formula (1), and the Dy (rare-earth element)-containing constituent coverage was obtained from the formula (2).

Si-containing Constituent Coverage (%)=(Number of Points with Si Element/Number of Measurement Points)×100     (1)

Dy (rare-earth element)-containing Constituent Coverage (%)=(Number of Points with Rare-earth Element/Number of Measurement Points)×100     (2)

In addition, the points with the detected concentrations of Dy (rare-earth element) and Si of 0.5 atom % or higher were determined to be points with Dy (rare-earth element) and Si.

It is to be noted that JEM-2200FS (from JEOL) was used for the STEM (Scanning Transmission Electron Microscope) in the STEM analysis mentioned above. The acceleration voltage is 200 kV. For the detector EDS (energy dispersive X-ray analyzer), an SDD detector (silicon drift detector) of JED-2300T (from JEOL) with an aperture of 60 mm$^2$ was used, and Noran System 7 was used for the EDS system.

In addition, the concentration measurement in the STEM point analysis was made for 30 seconds per point, and the concentration for each element was obtained by a Cliff-Lorimer method.

The values of the Si-containing constituent coverage (%) and Dy (rare-earth element)-containing constituent coverage (%) of the raw material particles are shown in Table 1 for each sample (ceramic green sheet) obtained in the way described above.

<4> Preparation of Multilayer Ceramic Element

1) First, the ceramic green sheets prepared in the way described above were stacked for a predetermined number of sheets so as to form an outer layer part with a predetermined thickness (for example, 100 µm), thereby forming a lower outer layer part.

2) Next, on the lower outer layer part formed in the step 1) mentioned above, electrode-pattern formed ceramic green sheets with internal electrode patterns formed by screen printing with a conductive paste containing a Ni powder as a conductive component onto the ceramic green sheets prepared in the way described above were stacked for a predetermined number of sheets (170 sheets in this embodiment) so that the internal electrode patterns extended to ends opposed to each other.

3) Then, on the stacked electrode-pattern formed ceramic green sheets, the ceramic green sheets were stacked for a predetermined number of sheets so as to form an outer layer part with a predetermined thickness (for example, 100 μm), thereby forming an upper outer layer part, and thus forming an unfired stacked block.

4) The unfired stacked block prepared in the way described above was cut in predetermined locations, thereby providing an unfired stacked structure to serve as the multilayer ceramic element 10 (FIG. 1) after firing.

5) Then, the unfired stacked structure obtained in the step 4) mentioned above was heated to 250° C. in a $N_2$ atmosphere to carry out binder removal treatment. Then, the structure was subjected to firing under the condition of a top temperature of 1240 to 1300° C. (1270° C. in this embodiment) with an oxygen partial pressure of $10^{-9}$ to $10^{-10}$ MPa ($10^{-9}$ MPa in this embodiment) in a reducing atmosphere composed of a $H_2$—$N_2$—$H_2O$ gas, thereby providing a fired multilayer ceramic element.

<5> Formation of External Electrode

To end surfaces of the obtained multilayer ceramic element, a conductive paste (external electrode paste) containing a Cu powder and containing $B_2O_3$—$Li_2O_3$—$SiO_2$—$BaO$-based glass frit was applied as a conductive component, and baked at a temperature of 850° C. in a $N_2$ atmosphere to form external electrodes (Cu electrodes) electrically connected to the internal electrodes.

Furthermore, Ni plated layers were formed so as to cover the Cu electrodes formed, and Sn plated layers were further formed so as to cover the Ni plated layers, thereby providing a multilayer ceramic capacitor structured as shown in FIG. 1.

It is to be noted that the external dimensions of the obtained multilayer ceramic capacitor were 2.0 mm in width, 1.3 mm in length, and 1.3 mm in thickness.

In addition, the ceramic layer (dielectric layer) 1 interposed between the internal electrodes 2 was 5.0 μm in thickness.

<6> Evaluation of Ceramic Layer (Porcelain) Constituting Multilayer Ceramic Capacitor For each of the multilayer ceramic capacitors (samples) prepared in the way described above, five samples were prepared, a part near the center in each of the length direction, width direction, and thickness direction was exposed by polishing for each of the five samples, and the ceramic layers (dielectric layers) near the center were processed into a thin piece.

Then, the sample processed into the thin piece (thin sample) was analyzed by STEM at ten grain boundaries (measurement at one point per grain). In this regard, one thin sample was taken from each of the five multilayer ceramic capacitors (samples), and ten grain boundaries were analyzed for the thin sample. Thus, fifty results from the analysis are obtained for one type of multilayer ceramic capacitor (sample).

Grain boundaries (crystal grain boundaries) nearly perpendicular to the thin film surface with a clear crystal interface between crystal grains adjacent to each other were selected as the grain boundaries analyzed.

It is to be noted that JEM-2200FS (from JEOL) was used for the STEM in the STEM analysis. The acceleration voltage was adjusted to 200 kV.

For the detector EDS, an SDD detector of JED-2300T (from JEOL) with an aperture of 60 $mm^2$ was used, and Noran System 7 was used for the EDS system.

In addition, the thin sample was approximately 100 nm in thickness.

For the concentration measurement in the STEM analysis, the point analysis was made for 30 seconds per point, and the concentration for each element was obtained by a Cliff-Lorimer method.

Central parts of the selected grain boundaries were subjected to point analysis, and the grain boundaries with a Dy detection concentration of 0.5 atom % or higher with respect to the total of the detected elements excluding C and O were determined to be grain boundaries with Dy present.

Then, the proportion of the number of grain boundaries with Dy present to the number of grain boundaries (the number of grain boundaries with Dy present/the number of grain boundaries analyzed×100) was obtained.

The results are shown as the Dy presence ratio in Table 1.

<7> Evaluation of Multilayer Ceramic Capacitor

For the multilayer ceramic capacitors prepared in the way mentioned above, the electrostatic capacitance was measured at 1 kHz-1 Vac, and the capacitors with the electrostatic capacitance between a 25% value and a 75% value were extracted as multilayer ceramic capacitors to be evaluated.

It is to be noted that the term "electrostatic capacitance between a 25% value and a 75% value" refers to samples excluding samples up to the 25th sample in the ascending order of the electrostatic capacitance and samples up to the 25th sample in the descending order of the electrostatic capacitance, that is, the fifty samples in total from the 26th sample to 75th sample in the ascending order of the electrostatic capacitance, for example, in the case of measuring the electrostatic capacitance for one hundred multilayer ceramic capacitors (samples).

In an environment at 125° C., a DC voltage of 150 V was applied for 2000 hours to the fifty multilayer ceramic capacitors (samples) extracted depending on the electrostatic capacitance value. Then, the insulation resistance values of the multilayer ceramic capacitors were measured while applying the voltage, and the capacitors with an insulation resistance value of 1 MΩ or less were considered to be defective (defective insulation resistance).

For the fifty samples subjected to the test, the number of samples with defective insulation resistance generated and the percent insulation defective are shown together in Table 1.

It is to be noted that in Table 1, the samples with sample numbers marked with * (the samples of sample numbers 1 to 5) refer to comparative samples that fail to meet the requirement of the present invention, whereas the other samples (the samples of sample numbers 6 to 9) refer to samples that meet the requirement of the present invention.

TABLE 1

| Sample Number | SiO$_2$ Powder Specific Surface Area (SSA) (m$^2$/g) | Grinding/Crushing Treatment Time (min) | Ceramic Green Sheet | | Fired Ceramic Layer Dy Presence Ratio (%) | The Number of Samples with Defective Insulation Resistance Generated and Ratio thereof (Defective sample number/50 samples) (Generation Ratio) |
|---|---|---|---|---|---|---|
| | | | Si Coverage (%) | Dy Coverage (%) | | |
| 1* | 31 | 100 | 67 | 81 | 84% | 7/50 (14%) |
| 2* | 31 | 300 | 82 | 84 | 90% | 3/50 (6%) |
| 3* | 31 | 600 | 91 | 91 | 92% | 1/50 (2%) |
| 4* | 63 | 100 | 84 | 76 | 88% | 5/50 (10%) |
| 5* | 63 | 300 | 96 | 84 | 96% | 1/50 (2%) |
| 6 | 63 | 600 | 99 | 96 | 100% | 0/50 (0%) |
| 7 | 135 | 100 | 95 | 85 | 98% | 0/50 (0%) |
| 8 | 135 | 300 | 100 | 89 | 100% | 0/50 (0%) |
| 9 | 135 | 600 | 100 | 94 | 100% | 0/50 (0%) |

From Table 1, in the case of sample numbers 6 to 9 that meet the requirements of the present invention prepared by the use of the ceramic green sheets with the Si-containing constituent coverage of 95% or higher obtained from the above formula (1) and the Dy (rare-earth element)-containing constituent coverage of 85% or higher obtained from the above formula (2), where the presence ratio of Dy (rare-earth element) in the dielectric layers is 98% or higher, it has been confirmed that high reliable multilayer ceramic capacitors are achieved which have no defective insulation caused in the above-described test for insulation resistance.

On the other hand, in the case of sample numbers 1 to 5 that fail to meet the requirements of the present invention prepared by the use of the ceramic green sheets with the Si-containing constituent coverage of less than 95% obtained from the above formula (1) or the Dy (rare-earth element)-containing constituent coverage of less than 85% obtained from the above formula (2), where the presence ratio of Dy (rare-earth element) in the ceramic dielectric layers is less than 98%, defective insulation resistance has been confirmed to be unfavorably caused in the above-mentioned test for insulation resistance.

From the results mentioned above, it is determined that the use of the ceramic green sheets with the Si-containing constituent coverage of 95% or higher and the Dy (rare-earth element)-containing constituent coverage of 85% or higher achieves highly reliable multilayer ceramic capacitors where the presence ratio of Dy (rare-earth element) in the ceramic dielectric layers is 98% or higher, without any defective insulation resistance caused.

It is to be noted that while a case of Dy as the rare-earth element has been described as an example in the embodiment described above, similar effects can be achieved even when other rare-earth element (for example, yttrium (Y), gadolinium (Gd), terbium (Tb), holmium (Ho), etc.) is used besides Dy as the rare-earth element.

In addition, while ceramic green sheets have been described where the ratio of Ba to Ti (Ba/Ti (molar ratio)) is 1.01 after firing, the Ba/Ti (molar ratio) is not to be considered limited thereto.

The present invention is further not to be considered limited to the embodiment described above even in other respects, various applications and modifications can be made within the scope of the invention.

DESCRIPTION OF REFERENCE SYMBOLS 1 ceramic layer
2(2a, 2b) internal electrode
3(3a, 3b) end surface of ceramic body
4(4a, 4b) external electrode
10 ceramic body
11 external electrode body
12 Ni plated film layer
13 Sn plated film layer
50 raw material particle
50a outer edge of raw material particle
P$_1$, P$_2$, P$_3$ analyzed point of raw material particle

The invention claimed is:
1. A ceramic green sheet comprising:
 a barium titanate-based ceramic particle as a main inorganic component;
 a Si-containing constituent having, when measured after removal of a binder, a coverage of 95% or greater along a surface of the barium titanate-based ceramic particle;
 Dy$_2$O$_3$ having, when measured after removal of the binder, a coverage of 85% or greater along the surface of the barium titanate-based ceramic particle;
 a Ba constituent;
 a Mg constituent;
 a Mn constituent; and
 a Si constituent,
 wherein, when a total content of Ti is 100 parts by mol:
  a content of Dy is 4.0 parts by mol;
  a content of Mg is 0.25 parts by mol;
  a content of Mn is 0.25 parts by mol; and
  a content of Si is 1.5 parts by mol.
2. The ceramic green sheet according to claim 1, wherein the ceramic green sheet has a Ba/Ti molar ratio of 1.01.
3. A method for manufacturing a multilayer ceramic capacitor, the method comprising:
 forming ceramic green sheets containing:
  a barium titanate-based ceramic particle as a main inorganic component,
  a Si-containing constituent having, when measured after removal of a binder, a coverage of 95% or greater along a surface of the barium titanate-based ceramic particle, and
  Dy$_2$O$_3$ having, when measured after removal of the binder, a coverage of 85% or greater along the surface of the barium titanate-based ceramic particle;
  a Ba constituent,
  a Mg constituent,
  a Mn constituent, and
  a Si constituent;

forming electrode-pattern sheets by applying a conductive paste to some of the ceramic green sheets in a predetermined pattern;

forming an unfired stacked structure by stacking the electrode pattern sheets with the ceramic green sheets interposed therebetween;

firing the unfired stacked structure to form a multilayer ceramic element having a plurality of dielectric layers and a plurality of internal electrodes opposed to each other with the dielectric layers interposed therebetween; and forming an external electrode electrically connected to the internal electrodes on the multilayer ceramic element, wherein, when a total content of Ti in the ceramic green sheets is 100 parts by mol:
- a content of Dy is 4.0 parts by mol;
- a content of Mg is 0.25 parts by mol;
- a content of Mn is 0.25 parts by mol; and
- a content of Si is 1.5 parts by mol.

4. The method for manufacturing a multilayer ceramic capacitor according to claim 3, wherein the plurality of dielectric layers have a Ba/Ti molar ratio of 1.01.

5. A multilayer ceramic capacitor comprising:

a multilayer ceramic element comprising a plurality of dielectric layers comprising a barium titanate-based ceramic, Dy, Ba, Mg, Mn and Si, and a plurality of internal electrodes opposed to each other with the dielectric layers interposed therebetween; and an external electrode on a surface of the multilayer ceramic element and electrically connected to the internal electrodes, wherein the Dy is present at 98% or greater of all grain boundaries in the barium titanate-based ceramic of the dielectric layers, and wherein, when a total content of Ti is 100 parts by mol in the plurality of dielectric layers:
- a content of Dy is 4.0 parts by mol;
- a content of Mg is 0.25 parts by mol;
- a content of Mn is 0.25 parts by mol; and
- a content of Si is 1.5 parts by mol.

6. The multilayer ceramic capacitor according to claim 5, wherein the plurality of dielectric layers have a Ba/Ti molar ratio of 1.01.

* * * * *